United States Patent
Jereczek et al.

(10) Patent No.: US 10,691,506 B2
(45) Date of Patent: Jun. 23, 2020

(54) DISTRIBUTED LOCK FOR DATA ACQUISITION SYSTEMS

(71) Applicant: INTEL CORPORATION, Santa Clara, CA (US)

(72) Inventors: Grzegorz Jereczek, Gdansk (PL); Jakub Radtke, Gdansk PM (PL); Pawel Makowski, Pomorskie (PL); Maciej Maciejewski, Gdansk (PL); Pawel Lebioda, Santa Clara, CA (US); Piotr Pelplinski, Sopot (PL); Aleksandra Wisz, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/236,162

(22) Filed: Dec. 28, 2018

(65) Prior Publication Data

US 2019/0138368 A1 May 9, 2019

(51) Int. Cl.
*G06F 16/23* (2019.01)
*G06F 9/52* (2006.01)
*G06F 9/50* (2006.01)
*H04L 9/06* (2006.01)
*G06F 16/907* (2019.01)
*G06F 16/182* (2019.01)

(52) U.S. Cl.
CPC ............ *G06F 9/526* (2013.01); *G06F 9/5038* (2013.01); *G06F 16/1824* (2019.01); *G06F 16/2343* (2019.01); *G06F 16/907* (2019.01); *H04L 9/0643* (2013.01)

(58) Field of Classification Search
CPC combination set(s) only.
See application file for complete search history.

(56) References Cited

U.S. PATENT DOCUMENTS

| | | | |
|---|---|---|---|
| 8,949,566 B2* | 2/2015 | Kandasamy | G06F 9/526 711/163 |
| 9,208,167 B1* | 12/2015 | Henderson | G06F 16/178 |
| 2006/0173364 A1* | 8/2006 | Clancy | A61B 5/04 600/485 |
| 2008/0046627 A1* | 2/2008 | Castro | G06F 13/4031 710/313 |
| 2011/0293291 A1* | 12/2011 | Kim | G06F 13/4282 398/200 |
| 2012/0144138 A1* | 6/2012 | Kandasamy | G06F 9/526 711/163 |
| 2016/0048415 A1* | 2/2016 | Sarma | G06F 9/5083 718/104 |
| 2017/0308548 A1* | 10/2017 | Baird, III | G06F 16/184 |
| 2019/0155795 A1* | 5/2019 | Xiao | G06F 16/00 |

* cited by examiner

*Primary Examiner* — Raymond N Phan
(74) *Attorney, Agent, or Firm* — Schwabe, Williamson & Wyatt, P.C.

(57) ABSTRACT

Systems and methods for managing locks in a data acquisition system with a distributed data storage are disclosed. In embodiments, a storage node of a data acquisition system with a plurality of storage nodes receives a request for an unprocessed event, where portions of the event data are stored across the plurality of storage nodes. One node of the plurality of nodes holds the lock value for the event. The node receiving the request searches for an event where it stores the lock value that is unlocked. If none is found, the node receiving the request forwards the request to a second node, which repeats the search.

19 Claims, 11 Drawing Sheets

DISTRIBUTED LOCK FOR DATA ACQUISITION SYSTEMS

TECHNICAL FIELD

Embodiments described herein generally relate to the field of computing. Specifically, methods, apparatuses and computer-readable medium for providing a distributed lock for use with a distributed data store as part of a data acquisition system are disclosed.

BACKGROUND

Data acquisition systems can be used to collect data snapshots, known as events, from multiple sensors, such as electronic detectors. In some implementations, such as a large scale deployment to scientific instruments like the Large Hadron Collider, these events can occur multiple times over a short timespan (sometimes millions of events per second), with a relatively large number of sensors. The relatively high number of events across a large number of sensors results in an influx of a substantial amount of data to be processed. Such large amounts of data can be captured using a data acquisition system that employs a distributed storage model, employing multiple data nodes that each may receive data from a subset of the total number of sensors.

DESCRIPTION OF EMBODIMENTS

Figure 1:
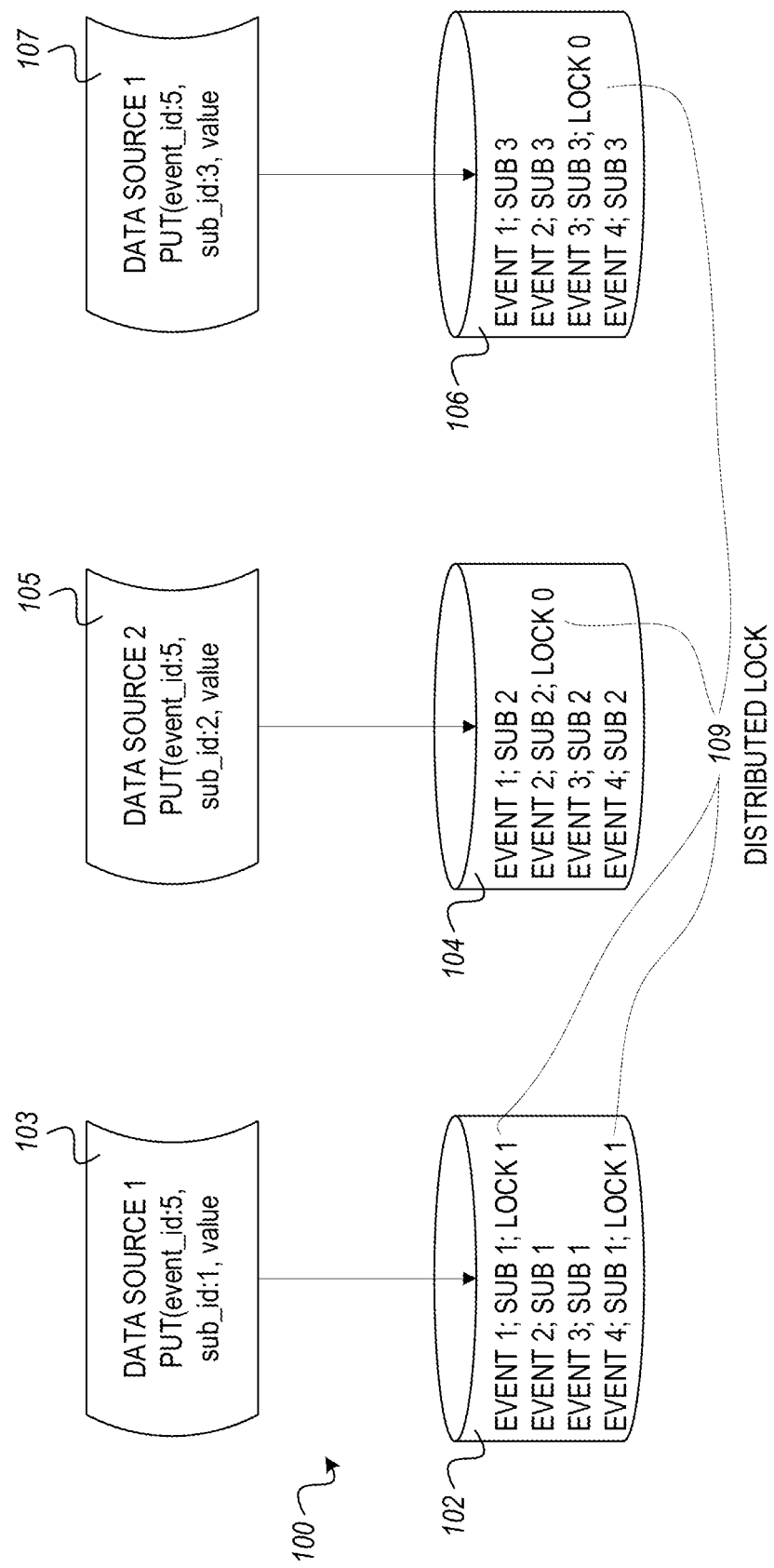
FIG. 1 illustrates an example data acquisition system for receiving event data from multiple sources and storing them in a distributed store, according to various embodiments.

Data acquisition (DAQ) systems that can collect data snapshots from a relatively large number of data sources in independent snapshots, produced at a rate of several MHz, may generate data in quantities that is preferably processed in a large computing farm. As large computing farms typically include multiple processing nodes that each can process the data of a separate event, a locking mechanism that allows each event to be locked while being processed may be employed to prevent a single event from being simultaneously processed by multiple processing nodes.

Known mechanisms typically are implemented using a single, central store, which keeps records of every event and its state. Large-scale DAQ systems designed to capture data for millions of events in rapid succession across multiple sensors may employ a distributed architecture, with a plurality of nodes, each of which collects data from one or a subset of the multiple sensors. This distributed architecture allows the DAQ system to scale to virtually limitless size. As the DAQ system size grows, a single, centralized store may be unable to feasibly keep up with the amount and speed of incoming events due to a number of potential factors, including data bandwidth, storage requirements, and/or cost of the hardware needed to implement a single store with sufficient capacity and/or power.

A possible solution is to provide a distributed access (locking) mechanism, which is incorporated into the data storage nodes of the DAQ system. As discussed above, for each event, its data are distributed across potentially hundreds of computer nodes (often called readout units), depending upon the scale of the system and number of sensors. Similarly, there can be thousands of processing nodes requesting unprocessed events in parallel to process the acquired data in a timely fashion. The disclosed embodiments incorporate the event lock across the storage nodes of the DAQ system. Thus, the locking mechanism scales along with the DAQ system, and imposes only minimal additional storage burden on each node.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an example data acquisition (DAQ) system 100 for capturing data from a plurality of sensors. In the depicted embodiment, system 100 includes a first storage node 102, second storage node 104, and third storage node 106. Each storage node is in communication with one or more data sources, such as one or more sensors. As may be seen in the depicted embodiment of FIG. 1, first storage node 102 receives data from data source 103, second storage node 104 receives data from data source 105, and third storage node 106 receives data from data source 107. As will be described in more detail, below, first storage node 102 receives data from data source 103, and along with second storage node 104 and third storage node 106 are incorporated with the distributed lock 109 technology of the present disclosure. Although FIG. 1 depicts three storage nodes and three data sources, this is merely for example; actual implementations may include tens, hundreds, thousands, or even more nodes and/or data sources, depending upon the specific needs for which system 100 is employed.

Each data source 103, 105, and 107 includes or are coupled with one or more sensors, the type of which will depend upon the specific requirements of a given implementation, such as the nature of the phenomenon that is being measured or recorded. In some embodiments, the various sensors may be analog in nature, with their signals first being digitized by one or more analog to digital converters (ADCs), and the digital signal comprising the value to be stored in the data source's associated storage node. Additionally, each data source 103, 105, and 107 may include components to interface with respective storage nodes 102, 104, and 106. In some embodiments, such an interface may be configured to convert data from the various sensors and/or ADCs and transmit the data to each data source's respective storage node. Further, each data source 103, 105, and/or 107 may include part or all of a computer device 500, which may be programmed to provide the interface between the sensors and a connected storage node. In other embodiments, the interface may be part of each storage node 102, 104, and/or 106, with one or more sensors connecting directly to each storage node.

In embodiments, each storage node 102, 104, and 106 includes or is otherwise in communication with data storage suitable for capturing the amount of data expected to be received from its respective data source 103, 105, and 107. As with the type of sensor, the specifics of the data storage will vary depending upon the needs of a given implementation of system 100. Further, although FIG. 1 depicts a 1:1 ratio of data sources to storage nodes, in other embodiments one or more of storage nodes 102, 104, or 106 may each be in communication with multiple data sources.

Each storage node 102, 104, and 106 of system 100 may be implemented, in whole or in part, as a stand-alone computer device 500 (such as a desktop or server), or may be integrated into one or more components of computer device 500, such as where computer device 500 is implemented as a laptop or portable device, such as a smartphone or tablet. In other implementations, each storage node 102, 104, and/or 106 (as well as one or more of data sources 103, 105, and/or 107) may be embedded in a system-on-chip, with a hardware accelerator, or as an application specific integrated circuit (ASIC). In still other implementations, some or all of storage node 102, 104, and/or 106, data sources 103, 105, and/or 107, may be implemented in whole or in part in software, or as a combination of software and hardware. In still other embodiments, each storage node 102, 104, and/or 106 may be integrated with one or more data source 103, 105, and/or 107, to provide a single unit that can both collect data and act as a storage node. Storage nodes 102, 104, and/or 106, as well as data sources 103, 105, and/or 107, may be implemented with one or more Internet of Things (IoT) devices, such as IoT device 1004 of FIG. 8, and further may be linked to together in various network topologies, such as those depicted in FIGS. 8-11.

Figure 2:
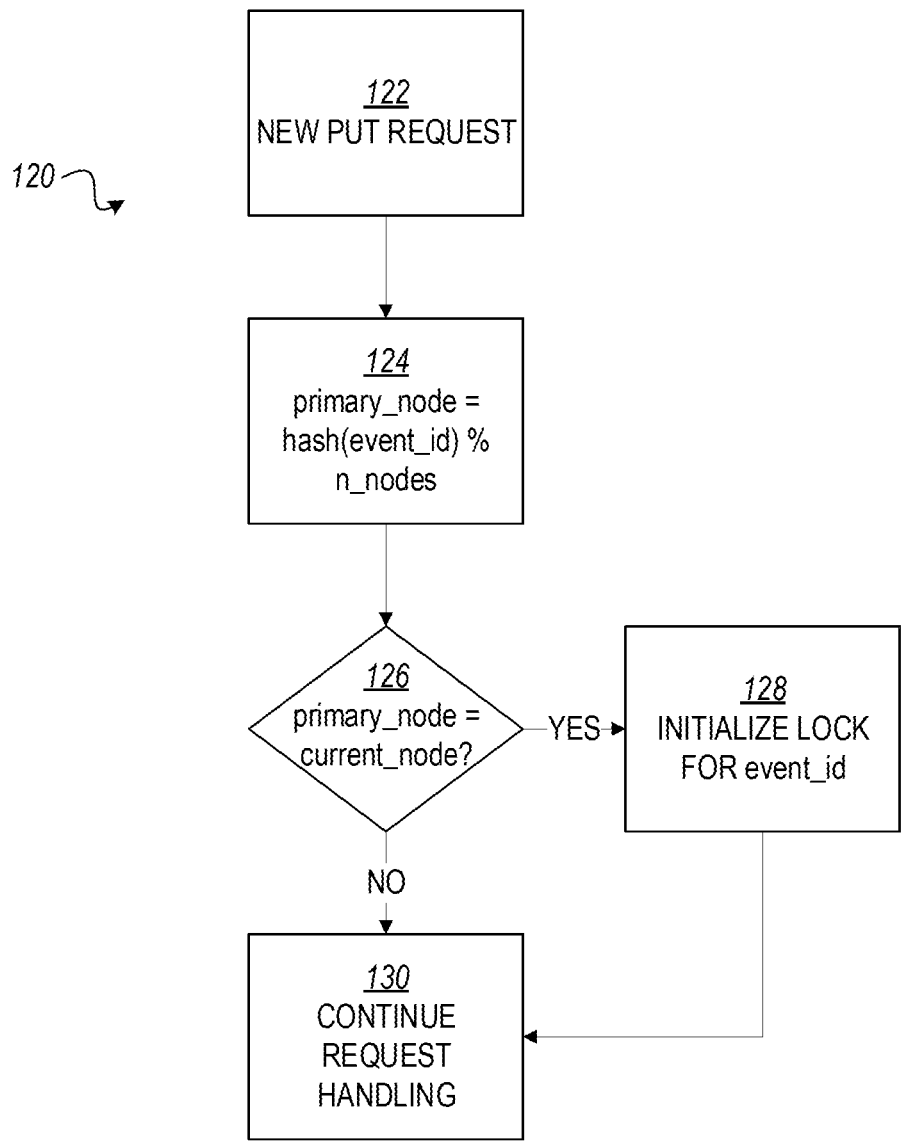
FIG. 2 is a flowchart of an example method that may be carried out by nodes of the data acquisition system of FIG. 1 for storing event data, according to various embodiments.

FIG. 2 depicts the operations of an example method 120 that may be implemented, in whole or in part, by some or all of system 100. Method 120 depicts one possible method for transmission of event data between one or more data sources, such as data sources 103, 105, and/or 107, to one or more distributed storage nodes connected to the data sources, such as storage nodes 102, 104, and/or 106, and determining and setting of a lock for all data associated with the event. Beginning with operation 122, a new request is received by a data storage node from a data source, to insert data from the data source into the data storage. The specifics of the request, e.g. whether it is labeled PUT, its size, and any associated fields or other data, will depend upon the requirements of a given implementation.

Data sources 103, 105, and 107 of FIG. 1 illustrate a request to place data into a storage node, designated here as a "PUT" request, of one possible embodiment. As can be seen, each PUT request includes at least an event_id field, a sub_id field, and a data point value. The event_id field designates a number that is unique to a given event. In embodiments, an event is single reading from all sensors at a single common point in time, with all data points that share a common event_id having been recorded substantially simultaneously. As can be seen in FIG. 1, data sources 103, 105, and 107 each have identical event_id fields of 5, indicating that the values from each data comprise a snapshot of readings at a single point in time. In each storage node 102, 104, and 106, previous events are shown as commonly sharing values of 1, 2, 3, and 4 across all nodes, with each event having a unique ID in a given storage node. The event_id may, in some embodiments, be assigned by each data source 103, 105, and/or 107, which may synchronize for simultaneous readings and likewise determine a unique event_id, such as by incrementing the previous event_id. In other embodiments, storage nodes 102, 104, and 106 may coordinate to assign each event a unique event_id. In such embodiments, data sources 103, 105, and 107 may omit the event_id from the PUT request, as the value will be determined and assigned at storage nodes 102, 104, and 106.

The sub_id field can designate the particular sensor or data source for a given data point. In other embodiments, such as where a single storage node may be in communication with multiple data sources, the sub_id field could instead indicate the identity of the particular storage node storing the data point. In FIG. 1, first data source 103 has a sub_id value of 1, second data source 105 has a sub_id value of 2, and third data source 107 has a sub_id value of 3. Conversely to each event_id and as can be seen in FIG. 1, each sub_id is common across all events on a per-storage node basis, but unique between storage nodes. As with the event_id, in some embodiments the sub_id may be assigned by data sources 103, 105, and 107, or by storage nodes 102, 104, and 106, where the data sources may omit the sub_id field from the PUT request.

The data point value is the actual data recorded by a sensor, and may be digitized, depending on the specifics of a given implementation, using an ADC to supply the numerical value for storage. Other embodiments may have different or additional fields in a PUT request. The particular structure and format of each data point value will depend upon the specifics of the sensor producing the value.

In operation 124 of method 120, the event_id field is used to determine which distributed storage node is to hold the lock field, where each lock field is part of distributed lock 109, for the event associated with the event_id. In the depicted embodiment, the equation of:

$$\text{primary node} = \text{hash}(\text{event\_id}) \% n\_\text{nodes}$$

is used to determine the identity of the storage node to hold the event lock field from the event_id. The hash function thus maps the event_id to the fixed size of the number of distributed storage nodes. As the number of events in some embodiments can be arbitrarily large and number well into the millions depending on the amount of events to be stored in the DAQ, the hash function allows such arbitrarily large numbers to provide for distribution of lock fields across all distributed storage nodes in the DAQ. Thus, the hash function facilitates distribution of the distributed lock 109. The result of the above equation is a number that corresponds to one of the distributed storage nodes. The format of the number may vary depending upon the needs of a given implementation; moreover, the result need not be a number, but can be any value or string that can be mapped to or otherwise identify one of the distributed storage nodes, such as storage nodes 102, 104, and/or 106. In some embodiments, the method may result in a roughly equal and random distribution of lock values across all distributed storage nodes over time.

The above equation, and/or its use of a hash table or function, need not be used to determine the identity of the distributed storage node to hold the event lock field corresponding to the event_id event. Any suitable method that can result in a repeatable identification of a storage node based on a given input value may be employed. Likewise, a value other than event_id may be used as the input to a function to repeatedly determine a storage node identity, so long as the value is useful to repeatedly determine the identity of the distributed storage node that holds the lock value for a given event. Some embodiments may employ a different function that results in some storage nodes being preferred over others to hold lock values, depending upon the needs of a given embodiment.

Referring back to the embodiment depicted in FIG. 1, the lock values for various events are shown stored at different storage nodes, distributing the event locks across all nodes of the DAQ system. In the depicted example, first storage node 102 includes the lock values for events with event_ids of 1 and 4, shown as a value of 1, indicating the event is locked. Second storage node 104 includes the lock value for the event with an event_id of 2, shown as a value of 0, indicating the event is unlocked. Similarly, third storage node 106 includes the lock value for the event with an event_id of 3, also shown as a value of 0, indicating the event is unlocked. Per operation 124, these locks would be distributed among the nodes based on the event_id value as input to the hash function equation.

In embodiments, the hash function equation of operation 124, along with the other operations of method 120, are performed by each distributed storage node in the DAQ system. In operation 126, the result of the hash function equation is compared, by each node, to determine if the result is equal to the storage node's identity or number. If so (the "YES" branch), in operation 128 the node adds a lock value to the data received as part of the PUT request, and proceeds to initialize the lock value. In some embodiments, the lock value has an initial default setting of unlocked. This value may be expressed in any suitable fashion. In some examples, a numerical value of 0 (considered to be "false" by many computer systems) indicates the event is unlocked, while a numerical value other than 0 (considered to be "true" by many computer systems) indicates the event is locked. In the depicted embodiment, a value of 1 is selected to indicate a locked status. Other embodiments may use other ways to indicate that a given event is locked or unlocked, depending upon the specific needs of a given embodiment.

It will be understood that, in embodiments, the value of the lock field stored in the storage node indicated by the hash function equation is effective for the associated event across all storage nodes of the DAQ system. Thus, setting the lock to true for event_id 1 of system 100 results in the data for all entries with an event_id of 1 across all storage nodes to be locked.

If the result of operation 126 is "NO", then method 120 proceeds to operation 130, where the storage node continues to handle the PUT request. In the example of FIG. 1, each storage node other than the one designated to store the lock value by the hash function proceeds to create an entry that includes the event_id, the sub_id, and the data value (not shown) from the data source. Other implementations may store other or different sets of fields, and/or may execute additional operations as necessary to complete processing of the event data.

Figure 3:
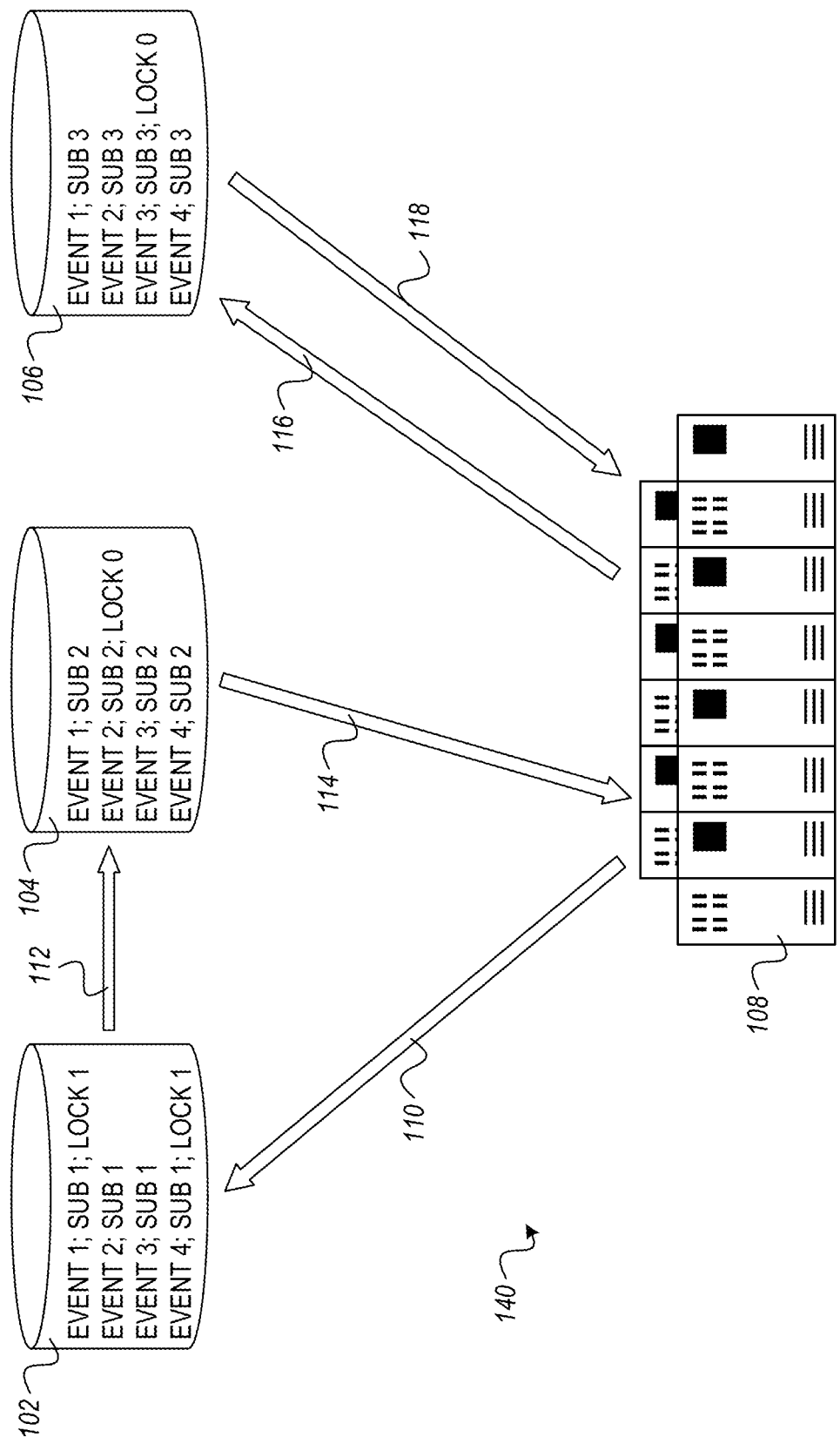
FIG. 3 illustrates an example data processing system that may interact with the distributed store of FIG. 1 to receive event data, according to various embodiments.

Turning to FIG. 3, an example system 140 for handling interactions between data storage nodes of a DAQ system and a processing farm is depicted. As with system 100, system 140 includes first storage node 102, second storage node 104, and third storage node 106, storing the same values depicted in FIG. 1. FIG. 3 also depicts a processing farm 108. Depending upon the nature of the data stored in the DAQ system. The processing farm 108 may be comprised of one, or multiple processing nodes or servers, particularly where the data is suitable for processing in parallel. For example, where each event can be processed independently, e.g., processing one event stands alone and does not rely on the results of processing other events, a processing farm comprised of multiple processing nodes may be employed, with each processing node responsible for retrieving and processing a single event. Other embodiments may be possible, such as splitting event data from different data storage nodes to different processing nodes, with the lock value indicating that a given event is currently in process. As with storage nodes 102, 104, and/or 106, and data sources 103, 105, and/or 107, processing farm 108 and/or one or more nodes of processing farm 108 (where processing farm 108 is implemented using multiple computing nodes) may be implemented with one or more Internet of Things (IoT) devices, such as IoT device 1004 of FIG. 8, and further may be linked to together in various network topologies, such as those depicted in FIGS. 8-11.

Figure 4:
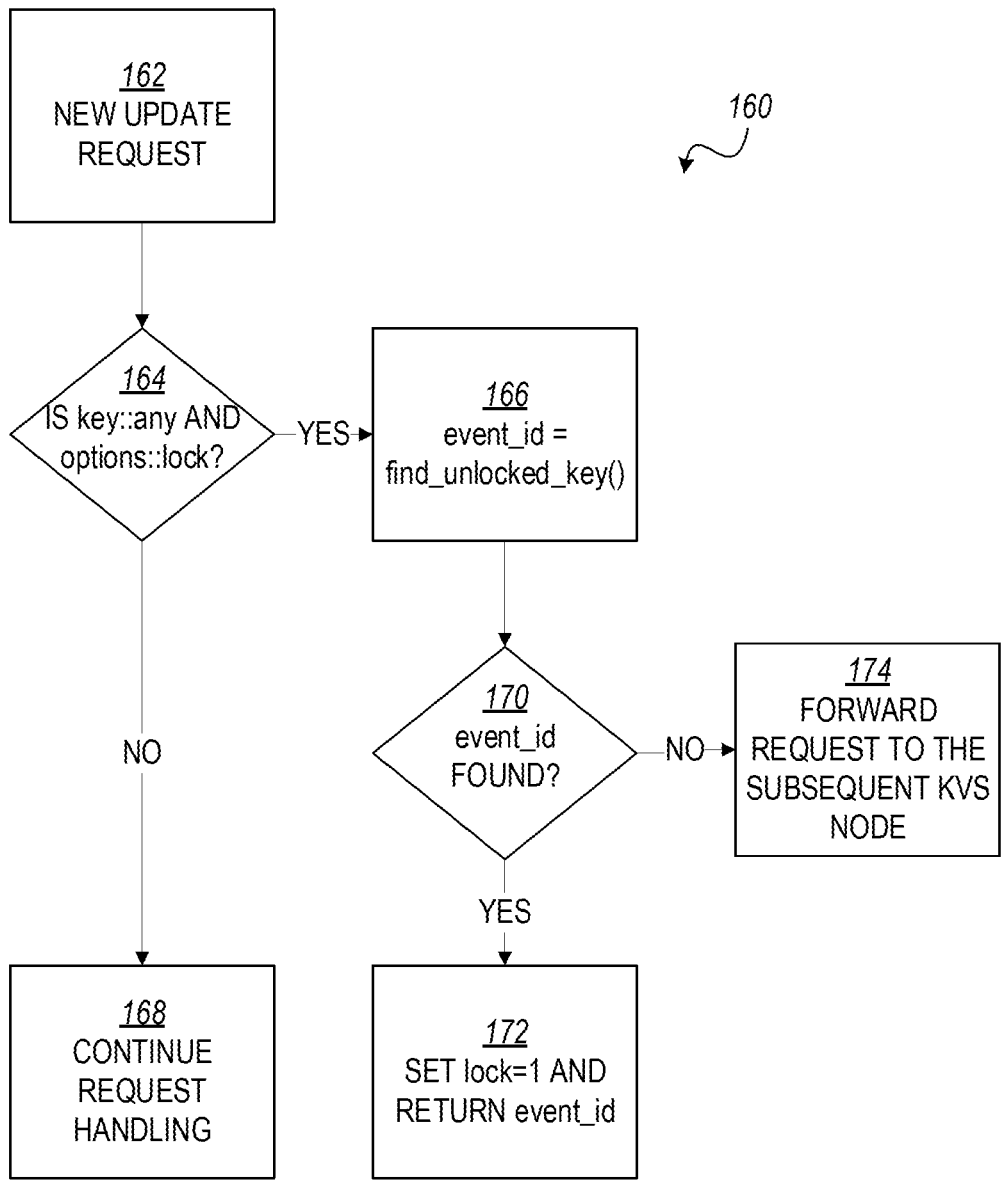
FIG. 4 is a flowchart of an example method for handling update requests to the distributed store that may be carried out by one or more components of the system of FIG. 3, according to various embodiments.

FIG. 4 depicts the operations of an example method 160 for retrieving and locking an event from a DAQ system with one or more distributed storage nodes, such as storage nodes 102, 104, and 106, by a processing facility, such as processing farm 108. The operations of method 160 may be performed in whole or in part. Starting with operation 162, an update request is received from a processing facility, e.g. a node or nodes of processing farm 108. The update request may be any operation to be performed on one or more events stored within the DAQ system, e.g. storage nodes 102, 104, and 106. For example, in some embodiments the request may be a database request, such as a structured query language (SQL) command or request, or another suitable method in which data may be requested from the DAQ system.

As opposed to method 120, where the method is performed by or for each data storage node substantially simultaneously, method 160 may be performed by or on behalf of only a single node at a time, as demonstrated in FIG. 3. For example, in FIG. 3, separate requests 110 and 116 are shown issuing from processing farm 108 each to first storage node 102 and third storage node 106, respectively, where second storage node 104 does not receive a request directly from processing farm 108. Upon receiving the request, only the storage node receiving the request acts upon the request, to execute example method 160. Moreover, processing farm 108 may be comprised of multiple compute or processing nodes, and different requests may come from different processing nodes. Thus, request 110 may come from a different processing node than request 116.

In operation 164, the request is parsed to determine if the request does not specify a specific event key (noted as key::any in FIG. 4), where the event key is a field such as event_id, and if the request is further to lock an event (noted as options::lock in FIG. 4). Thus, the operations of the depicted embodiment are directed to requests from a processing facility that seek any available unlocked event, for subsequent locking. It should be understood that at least some of these steps may be followed (as will be discussed below) even when a specific event ID is provided, where setting the lock value is still required (e.g., the request includes an options::lock, or a similar such indicator).

If the result of operation 164 is NO, method 160 proceeds to operation 168, where the request is otherwise processed by the receiving node. For example, a request to modify data of event ID 1, shown as locked in storage node 102, may be processed provided the request comes from the processing facility that holds the lock.

If the result of operation 164 is YES, method 160 proceeds to operation 166. In operation 166, the ID of an available (e.g. unlocked) event is obtained. This is depicted as implemented by a function, find_unlocked_key( ) which returns an event_id corresponding to an available, e.g. unlocked, event. How an unlocked event is located can depend on the specifics of a given implementation of the DAQ system, to be discussed below.

In one possible embodiment, the storage node receiving the update request may search through the events where it stores the associated lock value to locate the first event that has a stored lock value of unlocked. Proceeding to operation 170, if the result of the search is the location of an event with an unlocked status (e.g. the storage node holds at least one event and its corresponding lock value, where the lock value is unlocked), method 160 proceeds to operation 172, where storage node sets the event's lock value to locked, and then returns a key-value pair corresponding to the event's event_id, which is in turn communicated to the processing facility that made the initial request. Defined as a key-value pair, the result would be event_id::value, where value is a specific number or string that identifies an event, as described above with respect to FIG. 2. In some embodiments, only the key is (initially) returned. In other embodiments, the key and the value local to the storage node responding to the request are returned; in some such embodiments, in addition to the key and the local value, the sub_id may be returned, which can indicate the storage node associate with the value. Thus, the processing facility is granted the lock over the event corresponding to the returned event_id. The processing facility can proceed to access and process all data from all storage nodes by using the event_id.

For example, in system 140, each node of processing farm 108 may send a request with an event ID and possible commands such as retrieve, update, delete, etc., with the specified ID indicating the processing node possesses the lock for the specified ID. Per method 160, in operation 164, lack of options::lock combined with a specified event ID can be interpreted as a request for some action on the stored data associated with the event ID, for which the requesting processing node holds the lock. Where, in operation 164, a processing node specifies a specific event ID as well as options::lock, the storage node receiving the request may interpret the request as either requesting that the specified event be locked (and given to the requesting processing node) if the event is unlocked, or, if the requesting processing node holds the lock, as a request that the specified event be unlocked (the requesting processing node is relinquishing the lock). In some embodiments, the processing facility or node receiving an event lock may also receive a token or other indicator that it can use to verify that it possesses the lock associated with the locked event. In other embodiments, the storage node may store an ID of the requesting processing facility or node along with the lock value (or, in some embodiments, as the lock value to indicate a lock), to ensure that any requests to modify event data are coming from a processing facility that holds the lock.

With reference to FIG. 3, the result of operation 170 with a YES and subsequent operation 172 is depicted in request 116 and reply 118. A node of processing farm 108 submits a request to third storage node 106, where the results of find_unlocked_key( ) return an event_id of 3, corresponding to event 3, for which storage node 106 holds the lock value, set to 0 (unlocked). In response, in operation 172, storage node 106 returns the event_id value of 3 in reply 118, allowing the requesting node to proceed with requesting and processing data for event 3.

Referring again to FIG. 4, if the result of operation 170 is NO, e.g. the storage node receiving the request does not hold a lock value for any event that is unlocked, the method proceeds to operation 174, where the request is forwarded to another (e.g. subsequent) storage node, which either commences method 160 at operation 162, or, in some embodiments, may proceed straight to operation 166 if the storage node is aware that the entity forwarding the request is another storage node.

This arrangement of operations 170 and 174 is depicted in the embodiment of FIG. 3 with initial request 110, from a node of processing farm 108 sent to first storage node 102. First storage node 102 executes find_unlocked_key( ) which fails, as storage node 102 does not hold the lock value for any events that are unlocked. As can be seen, storage node holds the lock values for two events that are already locked (value of 1). The failure of find_unlocked_key( ) results in the NO branch, leading to operation 174, where the request is forwarded 112 to second storage node 104. Second storage node 104 then proceeds with method 160, and at operation 170 executes find_unlocked_key( ) against its stored event data. As storage node 104 includes an event ID 2 with a lock value of 0 (unlocked), storage node 104 then proceeds to operation 172 (the YES branch), where it sets the lock for event ID 2 to 1 (locked), and then replies 114 with a key-value of event_id::2 to the requesting node of processing farm 108. As shown in FIG. 3, reply 114 is provided directly to processing farm 108. However, in other embodiments, reply 114 may be passed back to the storage node that forwarded the request, for subsequent replying to the original source of the request.

It should further be understood that, were second storage node 104 to not hold any events with lock values of 0, e.g. find_unlocked_key( ) would fail, it in turn would forward the request to the next storage node, third storage node 106, and so forth until a storage node with an unlocked event is able to reply.

Components of systems 100 and/or 140, in embodiments, include or may be implemented using, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors such as general-purpose processors that may be used for general-purpose computing, and/or microprocessors that are purpose-built, such as specifically for processing of digital signals, and more specifically for processing of digital audio signals. Examples may include processors of the iAPX family, ARM family, MIPS family, SPARC family, PA-RISC family, POWER family, or any other suitable processor architecture now known or later developed. Still other embodiments may use an application-specific integrated circuit (ASIC) or field-programmable gate array (FPGA), which may be customized for use by one or more components of systems 100 and/or 140. In some embodiments, one or more components of systems 100 and/or 140 may be implemented in software, using computer readable media, that is executable by one of the foregoing processors. In other embodiments, a combination of hardware and software may be used to implement one or more components of systems 100 and/or 140.

Figure 5:
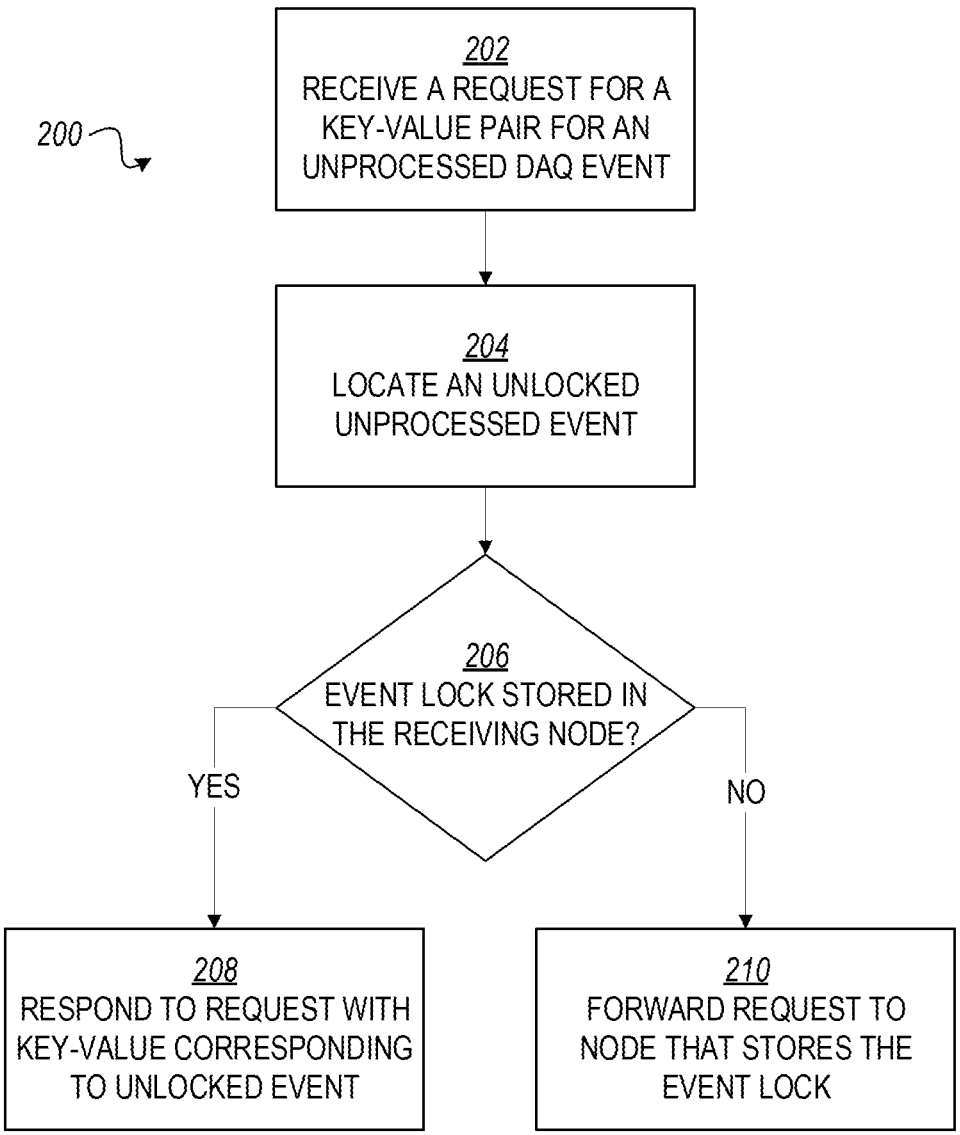
FIG. 5 is a flowchart of another example method for obtaining and locking an unprocessed event from the system of FIG. 3, according to various embodiments.

FIG. 5 is a flowchart of the operations of another example method 200 for obtaining a key-value pair of an unlocked event. Method 200 may be carried out by at least a portion of system 140, in whole or in part. Various operations of method 200 may overlap with operations of method 160, and so will not be repeated in detail here; the reader is directed to the foregoing discussion of method 160. Method 200 is a possible method that may be executed when a requesting storage node supplies an event ID along with a request to lock the event.

Starting in operation 202, a storage node, e.g. storage node 102, 104, or 106, receives a request for a key value pair for an unprocessed and/or unlocked event in the DAQ system. In response, in operation 204 the storage node locates an unprocessed event. This is similar in operation to a storage node executing the find_unlocked_key( ) function described above with respect to method 160.

If, in operation 206, an event is found within the storage node that includes a lock value of unlocked, then method 200 proceeds to operation 208 (the YES path), and proceeds to respond to the request with a key-value corresponding to the unlocked event. If, conversely, in operation 206 no event is found in the storage node that includes a lock value of unlocked, then method 200 proceeds to operation 210, and forwards the request to another node to locate an unlocked event.

As another possible embodiment, if the requesting processing node supplies an event ID, in operation 204, the receiving storage node may locate the event entry corresponding to the event ID and determine whether it also holds the associated lock value. Proceeding to operation 206, if the lock value is not present (the NO path), the receiving storage node may use the hash function equation discussed above to determine the storage node that holds the lock value and, once determined, forward the request to the storage node indicated by the hash function equation. As a further possible embodiment, such as for implementations where hash functions can be more rapidly executed rather than searching through events, the receiving storage node may execute the hash function equation immediately upon receiving a request from a processing node, to determine whether (and, if so, to which node) the request needs to be forwarded.

Figure 6:
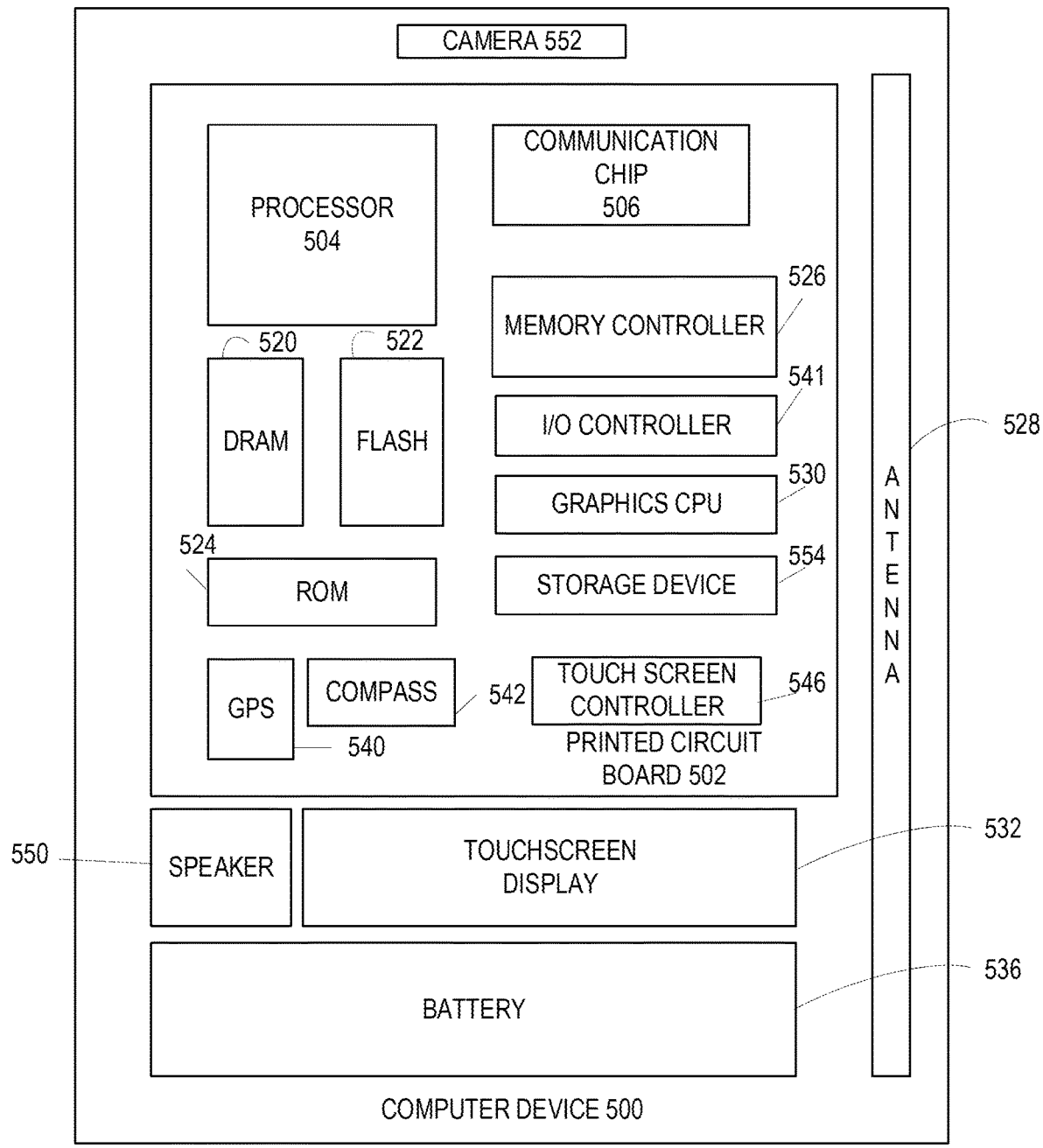
FIG. 6 is a block diagram of an example computer that can be used to implement some or all of the components of the system or methods disclosed herein, according to various embodiments.

FIG. 6 illustrates an example computer device 500 that may employ the apparatuses, systems and/or methods described herein (e.g., storage nodes 102, 104, and 106, and data sources 103, 105, and 107 of apparatuses 100 and 140), in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth. Where a storage node 102, 104, and/or 106 is implemented using a computer device 500, such nodes may particularly employ the non-volatile memory of one or more types described above.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to implement an operating system and/or one or more applications, including an application or database system capable of executing methods 120, 160, and/or 200. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

Figure 7:
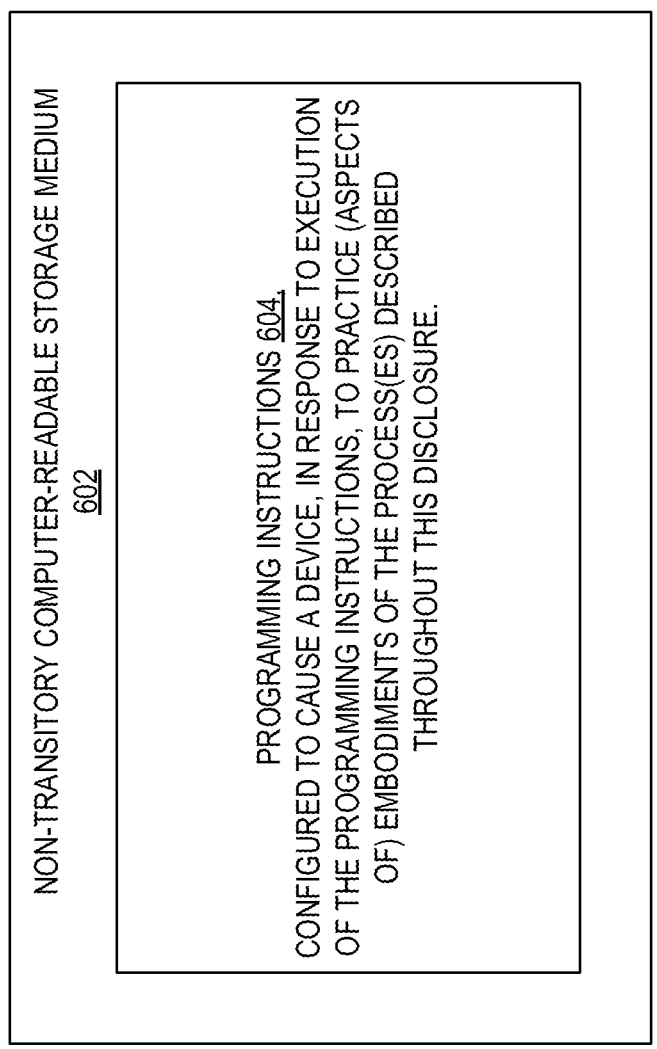
FIG. 7 is a block diagram of a computer-readable storage medium that can be used to implement some of the components of the system or methods disclosed herein, according to various embodiments.

As will be appreciated by one skilled in the art, the present disclosure may take the form of a computer program product or data to create the computer program, with the computer program or data embodied in any tangible or non-transitory medium of expression having the computer-usable program code (or data to create the computer program) embodied in the medium. FIG. 7 illustrates an example computer-readable non-transitory storage medium that may be suitable for use to store instructions (or data that creates the instructions) that cause an apparatus, in response to execution of the instructions by the apparatus, to practice selected aspects of the present disclosure. As shown, non-transitory computer-readable storage medium 602 may include a number of programming instructions 604 (or data to create the programming instructions). Programming instructions 604 may be configured to enable a device, e.g. computer 500, in response to execution of the programming instructions, to perform, e.g. implement (various aspects of) storage nodes 102, 104, and 106, and data sources 103, 105, and 107, and/or other aspects of the present disclosure.

In alternate embodiments, programming instructions 604 (or data to create the instructions) may be disposed on multiple computer-readable non-transitory storage media 602 instead. In alternate embodiments, programming instructions 604 (or data to create the instructions) may be disposed on computer-readable transitory storage media 602, such as, signals. Any combination of one or more computer usable or computer readable medium(s) may be utilized. The computer-usable or computer-readable medium may be, for example but not limited to, one or more electronic, magnetic, optical, electromagnetic, infrared, or semiconductor system, apparatuses, devices, or propagation media. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in one or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code (such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the Program code (or data to create the program code) may need to be configured (e.g., settings stored, data input, network addresses recorded, etc.) before the program code (or data to create the program code) can be executed/used in whole or in part. Thus, the disclosed Program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The internet of things (IoT) is a concept in which a large number of computing devices, such as the storage nodes 102, 104, and/or 106, data sources 103, 105, and/or 107, and processing farm 108, are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 8-11.

Figure 8:
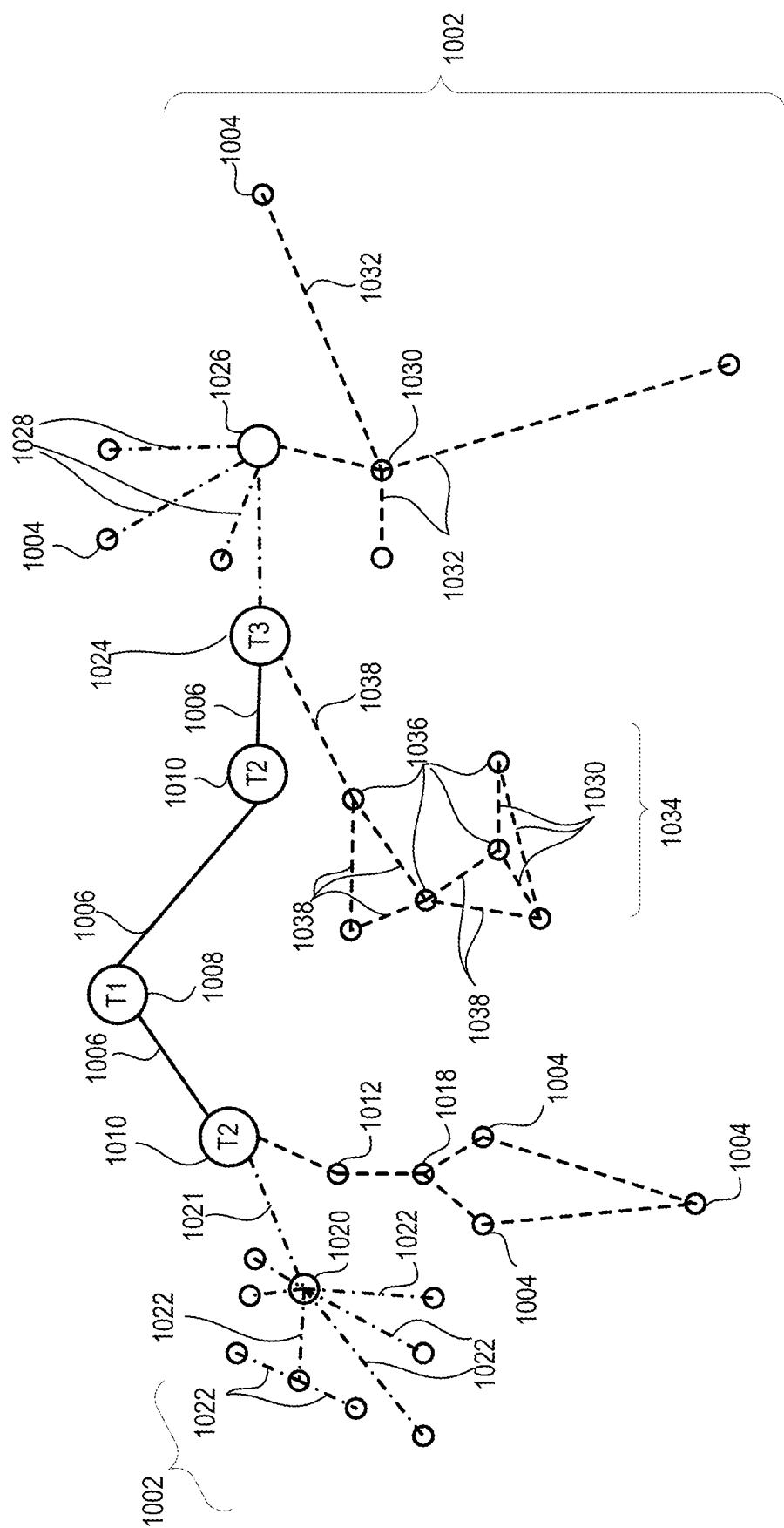
FIG. 8 illustrates an arrangement showing interconnections that may be present between a network and Internet of Things (IoT) networks, in accordance with various embodiments.

FIG. 8 illustrates an arrangement showing interconnections that may be present between the Internet and IoT networks, in accordance with various embodiments. The interconnections may couple smaller networks 1002, down to the individual IoT device 1004 (such as data sources 103, 105, and 107, storage nodes 102, 104, and 106, and (nodes of) processing farm 108), to the fiber backbone 1006 of the Internet 1000. To simplify the drawing, not every device 1004, or other object, is labeled.

In FIG. 8, top-level providers, which may be termed tier 1 providers 1008, are coupled by the fiber backbone of the Internet to other providers, such as secondary or tier 2 providers 1010. In one example, a tier 2 provider 1010 may couple to a tower 1012 of an LTE cellular network, for example, by further fiber links, by microwave communications 1014, or by other communications technologies. The tower 1012 may couple to a mesh network including IoT devices 1004 through an LTE communication link 1016, for example, through a central node 1018. The communications between the individual IoT devices 1004 may also be based on LTE or NR communication links 1016. In another example, a high-speed uplink 1021 may couple a tier 2 provider 1010 to a gateway (GW) 1020. A number of IoT devices 1004 may communicate with the GW 1020, and with each other through the GW 1020, for example, over BLE links 1022.

The fiber backbone 1006 may couple lower levels of service providers to the Internet, such as tier 3 providers 1024. A tier 3 provider 1024 may be considered a general Internet service provider (ISP), for example, purchasing access to the fiber backbone 1010 from a tier 2 provider 1010 and providing access to a corporate GW 1026 and other customers. From the corporate GW 1026, a wireless local area network (WLAN) can be used to communicate with IoT devices 1004 through Wi-Fi® links 1028. A Wi-Fi link 1028 may also be used to couple to a low power wide area (LPWA) GW 1030, which can communicate with IoT devices 1004 over LPWA links 1032, for example, compatible with the LoRaWan specification promulgated by the LoRa alliance.

The tier 3 provider 1024 may also provide access to a mesh network 1034 through a coordinator device 1036 that communicates with the tier 3 provider 1024 using any number of communications links, such as an LTE cellular link, an LPWA link, or a link 1038 based on the IEEE 802.15.4 standard, such as Zigbee®. Other coordinator devices 1036 may provide a chain of links that forms cluster tree of linked devices.

IoT devices 1004 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 1004 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 1004 may be biotic devices such as monitoring implants, biosensors, biochips, and the like. In other embodiments, an IoT device 1004 may be a computer device that is embedded in a computer system and coupled with communications circuitry of the computer system. In such embodiments, the IoT device 1004 refer to a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 1004 may include one or more memory devices and one or more processors to capture and store/record data. Each of the IoT devices 1004 may include appropriate communications circuitry (e.g., transceiver(s), modem, antenna elements, etc.) to communicate (e.g., transmit and receive) captured and stored/recorded data. Further, each IoT device 1004 may include other transceivers for communications using additional protocols and frequencies. The wireless communications protocols may be any suitable set of standardized rules or instructions implemented by the IoT devices 1004 to communicate with other devices, including instructions for packetizing/depacketizing data, instructions for modulating/demodulating signals, instructions for implementation of protocols stacks, and the like. For example, IoT devices 1004 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of the IoT devices 1004, tower 1012, GW 1020, 1026, and 1030, coordinator device 1036, and so forth, may also be incorporated with the embodiments described herein, in particular, with references to FIGS. 1 and 3. In particular, the IoT devices 1004, tower 1012, GW 1020, 1026, and 1030, coordinator device 1036, and so forth, may correspond with the computing devices/systems discussed previously with regard to FIGS. 1-7.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 9:
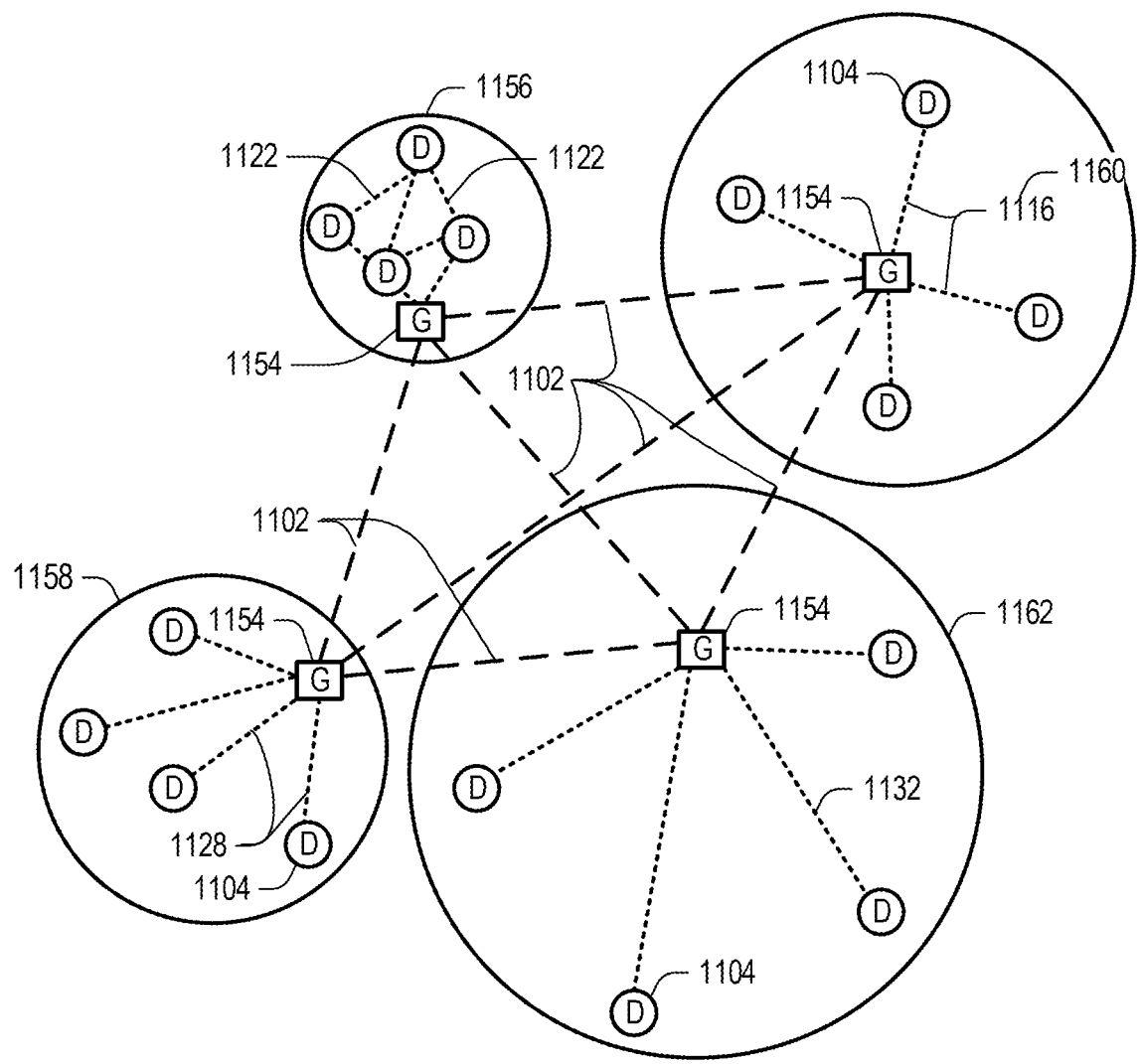
FIG. 9 illustrates an example domain topology, in accordance with various embodiments.

FIG. 9 illustrates an example domain topology 1100 that may be used for a number of IoT networks coupled through backbone links 1102 to GWs 1154, in accordance with various embodiments. To simplify the drawing, not every device 1104, or communications link 1116, 1122, 1128, or 1132 is labeled. The backbone links 1102 may include any number of wired or wireless technologies, and may be part of a local area network (LAN), a wide area network (WAN), or the Internet. Similar to FIG. 8, in embodiments, one or more of IoT devices 1104 (which may be the same or similar as IoT devices 1004 of FIG. 10), GWs 1154, and so forth, may be incorporated with embodiments described herein. In particular, the various devices shown by FIG. 9 may correspond with the data sources 103, 105, and 107, storage nodes 102, 104, and 106, processing farm 108, etc., discussed previously with regard to FIGS. 1-7.

The network topology 1100 may include any number of types of IoT networks, such as a mesh network 1156 using BLE links 1122. Other IoT networks that may be present include a WLAN network 1158 using WiFi links 1128, a cellular network 1160 using cellular links 1116, and an LPWA network 1162 using LPWA links 1132. Each of these IoT networks may provide opportunities for new developments, as described herein. For example, communications between IoT devices 1104, such as over the backbone links 1102, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 1106 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1158 uses systems that perform standards conversion to provide multi-standard connectivity, enabling IoT devices 1104 using different protocols to communicate. Further systems may provide seamless interconnectivity across a multi-standard infrastructure comprising visible Internet resources and hidden Internet resources. Communications in the cellular network 1160 may be enhanced by systems that offload data, extend communications to more remote devices, or both. The LPWA network 1162 may include systems that perform non-Internet protocol (IP) to IP interconnections, addressing, and routing.

Figure 10:
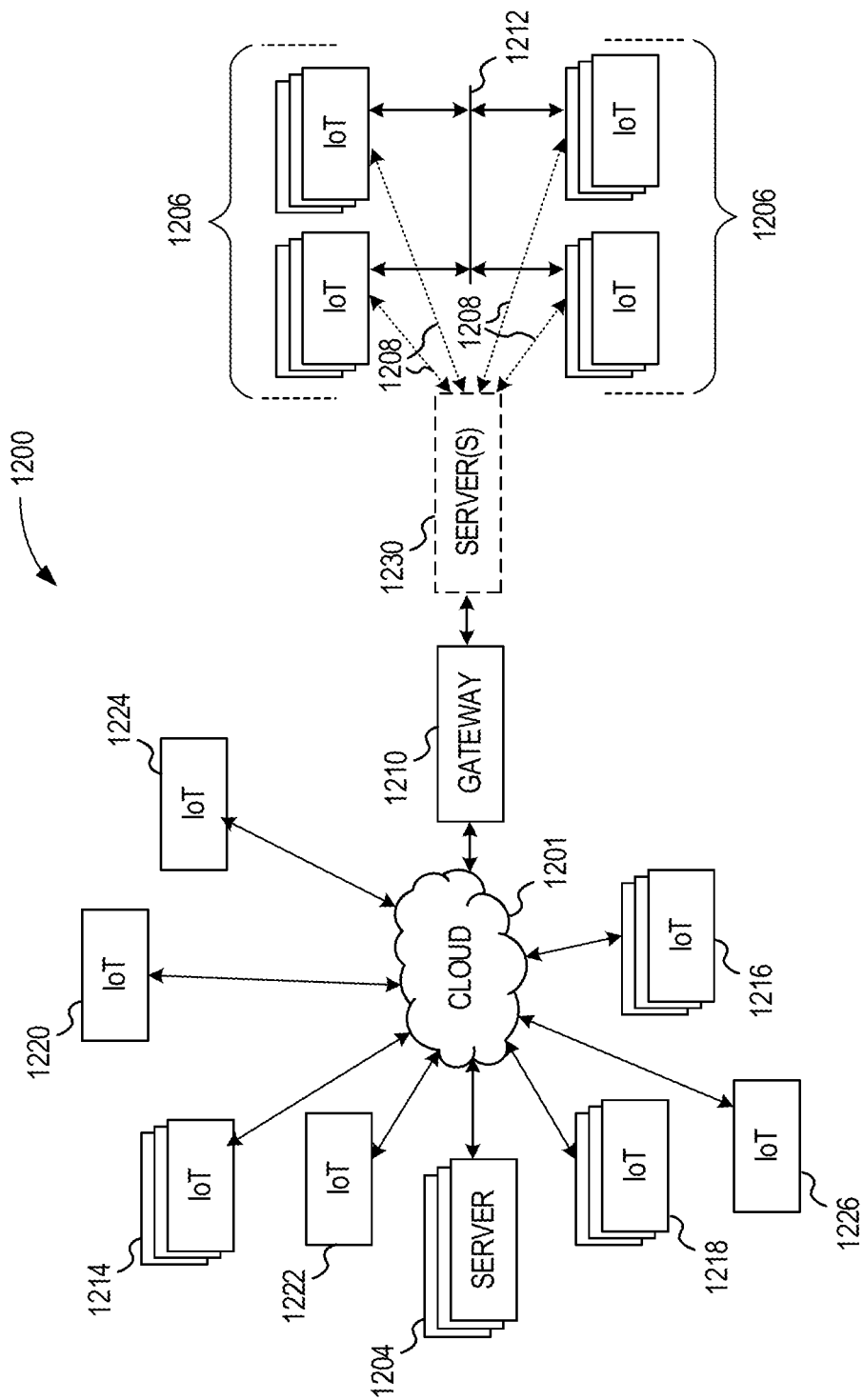
FIG. 10 illustrates an example cloud computing network or cloud in communication with a number of IoT devices, in accordance with various embodiments.

FIG. 10 illustrates an arrangement 1200 of example cloud computing network, or cloud 1201, in communication with a number of Internet of Things (IoT) devices, in accordance with various embodiments. The cloud 1201 may represent the Internet, one or more cellular networks, a local area network (LAN) or a wide area network (WAN) including proprietary and/or enterprise networks for a company or organization, or combinations thereof. Cloud 1201 may correspond to connections between the various storage nodes 102, 104, and 106, between the storage nodes 102, 104, 106 and processing farm 108, and cloud 1001 of FIG. 8. Components used for such communications system can depend at least in part upon the type of network and/or environment selected. Protocols and components for communicating via such networks are well known and will not be discussed herein in detail. However, it should be appreciated that cloud 1201 may be associated with network operator who owns or controls equipment and other elements necessary to provide network-related services, such as one or more base stations or access points, and one or more servers for routing digital data or telephone calls (for example, a core network or backbone network).

The IoT devices in FIG. 10 may be the same or similar to the IoT devices 1004 discussed with regard to FIGS. 8-9. In particular, the IoT devices in FIG. 10 may correspond with the storage nodes 102, 104, and 106, data sources 103, 105, and 107, etc., discussed previously with regard to FIG. 1-7. The IoT devices may include any number of different types of devices, grouped in various combinations, such as IoT group 1206 that may include IoT devices that provide one or more services for a particular user, customer, organizations, etc. A service provider may deploy the IoT devices in the IoT group 1206 to a particular area (e.g., a geolocation, building, etc.) in order to provide the one or more services. In one example, the IoT group 1206 may be a traffic control group where the IoT devices in the IoT group 1206 may include stoplights, traffic flow monitors, cameras, weather sensors, and the like, to provide traffic control and traffic analytics services for a particular municipality or other like entity. Similar to FIGS. 8-9, in embodiments, one or more of IoT devices 1214-1224, GW 1210, and so forth, may be incorporated with the various embodiments described herein, in particular, with references to FIGS. 1-7. For example, in some embodiments, the IoT group 1206, or any of the IoT groups discussed herein, may include the components, devices, systems discussed with regard to FIGS. 1-7.

The IoT group 1206, or other subgroups, may be in communication with the cloud 1201 through wireless links 1208, such as LPWA links, and the like. Further, a wired or wireless sub-network 1212 may allow the IoT devices to communicate with each other, such as through a local area network, a wireless local area network, and the like. The IoT devices may use another device, such as a GW 1210 to communicate with the cloud 1201. Other groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, or both. In some embodiments, the servers 1204 correspond with one or more storage nodes 102, 104, and 106, and/or nodes of processing farm 108, discussed previously.

As can be seen from FIG. 10, a large number of IoT devices may be communicating through the cloud 1201. This may allow different IoT devices to request or provide information to other devices autonomously. For example, the IoT group 1206 may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

In another example, the IoT group 1206 may be an industrial control group (also referred to as a "connected factory", an "industry 4.0" group, and the like) where the IoT devices in the IoT group 1206 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. For example, IoT group 1206 may comprise the data sources 103, 105, and 107. In this example, the IoT group 1206 may communicate with the servers 1204 via GW 1210, server(s) 1230, and cloud 1201 to provide captured data, which may be used to provide performance monitoring and analytics to the manufacturer or factory operator. Additionally, where the GW 1210 or one or more of the server(s) 1230 is or includes the storage nodes 102, 104, and 106, and/or processing farm 108 of FIGS. 1-7 discussed supra, the IoT group 1206 may communicate with the GW 1210 and/or one or more of the server(s) 1230 for recording and processing events and event data from DAQ 100 according to the various embodiments discussed herein. Furthermore, the IoT devices in the IoT group 1206 may communicate among each other, and/or with other IoT devices of other IoT groups, to make decisions on their own and to perform their tasks as autonomously as possible.

Clusters of IoT devices, such as the IoT groups depicted by FIG. 10, may be equipped to communicate with other IoT devices as well as with the cloud 1201. This may allow the IoT devices to form an ad-hoc network between the devices, allowing them to function as a single device, which may be termed a fog device. This is discussed further with respect to FIG. 10.

Figure 11:
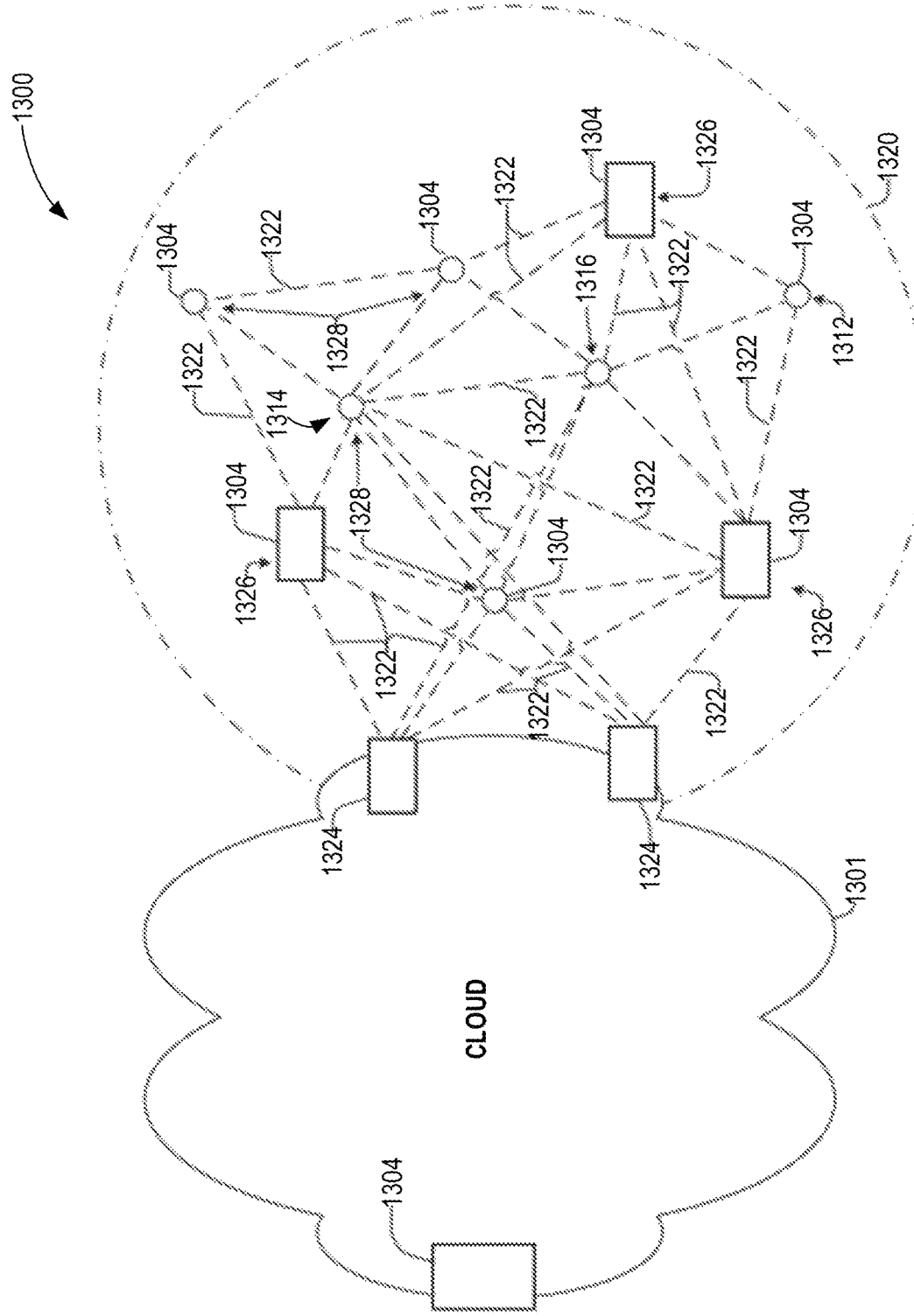
FIG. 11 illustrates an arrangement of a cloud computing network or cloud in communication with a mesh network of IoT devices or IoT fog, in accordance with various embodiments.

FIG. 11 illustrates an arrangement 1300 of a cloud computing network, or cloud 1301, in communication with a mesh network of IoT devices, which may be termed a fog device 1320 or fog 1320, operating at the edge of the cloud 1301, in accordance with various embodiments. Cloud 1301 may be the same or similar to cloud 1001 of FIG. 8 and cloud 1201 of FIG. 10. In this example, the fog 1320 is a group of IoT devices at an intersection (e.g., and may include one or more IoT groups 1206 of FIG. 10). The fog 1320 may be established in accordance with specifications released by the OpenFog Consortium (OFC), the Open Connectivity Foundation™ (OCF), among others. In some embodiments, the fog 1320 may be a tangle as defined by the IOTA foundation. Additionally, each of the IoT devices in the fog 1320 may correspond with the storage nodes 102, 104, 106, and/or data sources 103, 105, 107, discussed previously with regard to FIGS. 1-7.

In embodiments, fog computing systems, such as fog 1320, may be mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from Cloud 1301 to Things (e.g., IoT devices 1304).

Fog computing systems may be used to perform low-latency computation/aggregation on the data while routing it to an edge cloud computing service and/or a central cloud computing service (e.g., storage nodes 102, 104, 106, and/or data sources 103, 105, 107 in FIG. 1) for performing heavy computations or computationally burdensome tasks. On the other hand, edge cloud computing consolidates human-operated, voluntary resources, as a cloud. These voluntary resource may include, inter-alia, storage nodes 102, 104, 106, and/or data sources 103, 105, 107, desktop PCs, tablets, smartphones, nano data centers, and the like. In various implementations, resources in the edge cloud may be in one to two-hop proximity to the IoT devices 1304, which may result in reducing overhead related to processing data and may reduce network delay.

In some embodiments, the fog 1320 may be a consolidation of IoT devices 1304 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog 1320 may operate at the edge of the cloud 1301. The fog 1320 operating at the edge of the cloud 1301 may overlap or be subsumed into an edge network of the cloud 1301. The edge network of the cloud 1301 may overlap with the fog 1320, or become a part of the fog 1320. Furthermore, the fog 1320 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as the storage nodes 102, 104, 106, and/or data sources 103, 105, 107, of FIGS. 1-7.

Data may be captured, stored/recorded, and communicated among the IoT devices 1304 (or, for example, among the storage nodes 102, 104, and 106 that have direct links with one another as shown by FIGS. 1 and 3). Analysis of the traffic flow and control schemes may be implemented by aggregators 1326 that are in communication with the IoT devices 1304 and each other through a mesh network. The aggregators 1326 may be a type of IoT device 1304 and/or network appliance. In some examples, the aggregators may be stationary infrastructure equipment, such as processing farm 108. Data may be uploaded to the cloud 1301 (e.g., storage nodes 102, 104, and 106 in FIG. 1) via the aggregator, and commands can be received from the cloud 1301 through GWs 1324 that are in communication with the IoT devices 1304 and the aggregators 1326 through the mesh network. Unlike the traditional cloud computing model, in some implementations, the cloud 1301 may have little or no computational capabilities and only serves as a repository for archiving data recorded and processed by the fog 1320. In these implementations, the cloud 1301 centralized data storage system and provides reliability and access to data by the computing resources in the fog 1320 and/or edge devices. Being at the core of the architecture, the Data Store of the cloud 1301 is accessible by both Edge and Fog layers of the aforementioned edge-fog network.

Similar to FIGS. 8-11, in embodiments, one or more of IoT devices 1304, aggregators 1326, and so forth, may be incorporated with the various embodiments described herein, in particular, with references to FIGS. 1-7. For example, and with reference to FIGS. 1 and 3, storage nodes 102, 104, and 106 (and other storage nodes) may form a cloud network or fog 1320 for creating some or all of DAQ system 100, according to the embodiments discussed herein.

Any number of communications links may be used in the fog 1320. Shorter-range links 1322, for example, compatible with IEEE 802.15.4 may provide local communications between IoT devices that are proximate to one another or other devices. Longer-range links 1322, for example, compatible with LPWA standards, may provide communications between the IoT devices and the GWs 1324. To simplify the diagram, not every communications link 1322 is labeled with a reference number.

The fog 1320 may be considered to be a massively interconnected network wherein a number of IoT devices are in communications with each other, for example, by the communication links 1322. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1324. In these networks, the number of interconnections may provide substantial redundancy, allowing communications to be maintained, even with the loss of a number of IoT devices.

Not all of the IoT devices may be permanent members of the fog 1320. In the example of FIG. 11, three transient IoT devices have joined the fog 1320, a first mobile device 1312, a second mobile device 1314, and a third mobile device 1316. The fog 1320 may be presented to clients in the cloud 1301, such as the server 1334, as a single device located at the edge of the cloud 1301. In this example, the control communications to specific resources in the fog 1320 may occur without identifying any specific IoT device 1304 within the fog 1320. Accordingly, if any IoT device 1304 fails, other IoT devices 1304 may be able to discover and control a resource. For example, the IoT devices 1304 may be wired so as to allow any one of the IoT devices 1304 to control measurements, inputs, outputs, etc., for the other IoT devices 1304. The aggregators 1326 may also provide redundancy in the control of the IoT devices 1304 and other functions of the fog 1320.

In some examples, the IoT devices may be configured using an imperative programming style, e.g., with each IoT device having a specific function and communication partners. However, the IoT devices forming the fog 1320 may be configured in a declarative programming style, allowing the IoT devices to reconfigure their operations and communications, such as to determine needed resources in response to conditions, queries, and device failures. This may be performed as transient IoT devices, such as the mobile devices 1312, 1314, 1316, join the fog 1320. As transient or mobile IoT devices enter or leave the fog 1320, the fog 1320 may reconfigure itself to include those devices. This may be performed by forming a temporary group of the mobile devices 1312 and 1314 and the third mobile device 1316 to control or otherwise communicate with the IoT devices 1304. If one or both of the devices 1312, 1314 are autonomous, the temporary group may provide instructions to the devices 1312, 1314. As the transient devices 1312, 1314, and 1316, leave the vicinity of the fog 1320, it may reconfigure itself to eliminate those IoT devices 1304 from the network. The fog 1320 may also divide itself into functional units, such as the IoT devices 1304 and other IoT devices proximate to a particular area or geographic feature, or other IoT devices that perform a particular function. This type of combination may enable the formation of larger IoT constructs using resources from the fog 1320.

As illustrated by the fog 1320, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

EXAMPLES

The following examples pertain to further embodiments.

Example 1 is a non-transitory computer readable medium (CRM) comprising instructions that, when executed by a first node of a distributed data store, cause the first node to receive a request for a data acquisition event; retrieve, from a plurality of unprocessed data acquisition events stored in the distributed data store, an event with a lock in an unlocked status; determine whether the lock for the unlocked event is stored in the first node; and respond with an event ID corresponding to the unlocked event if the first node stores the lock, or forward the request to a second node of the distributed data store that stores the lock.

Example 2 includes the subject matter of example 1, or some other example herein, wherein the instructions are to further cause the first node to set the lock to a locked status.

Example 3 includes the subject matter of example 2, or some other example herein, wherein the instructions are to cause the first node to set the lock to a locked status by setting a lock metadata field embedded with the data acquisition event.

Example 4 includes the subject matter of any of examples 1-3, or some other example herein, wherein the instructions are to further cause the first node to use a hash function in combination with the event ID to determine the second node to forward the request.

Example 5 is a method for managing event locks in a distributed data store, the distributed data store adapted to store a plurality of data acquisition events, comprising receiving, at a first node in the distributed data store, a request for a key-value pair for an unprocessed data acquisition event from the plurality of data acquisition events; locating, by the first node, in the distributed data store, an unlocked event; determining, by the first node, whether a lock for the unlocked event is stored in the first node; and responding, by the first node, to the request with a key-value corresponding to the unlocked event if the first node stores the lock, or forwarding, by the first node if the first node does not store the lock, the request to a second node of the distributed data store that stores the lock.

Example 6 includes the subject matter of example 5, or some other example herein, comprising retrieving, by the first node, an event ID corresponding to the unlocked event.

Example 7 includes the subject matter of 6, or some other example herein, further comprising determining the identity of the second node by processing the event ID through a hash function.

Example 8 includes the subject matter of any of examples 5-7, or some other example herein, further comprising initializing the lock, by the first node, where the first node stores the lock.

Example 9 includes the subject matter of example 8, or some other example herein, wherein initializing the lock comprises setting a lock value stored on the first node to indicate that the event is locked.

Example 10 is a system for distributed lock management for data acquisition, comprising a first node of a distributed key-value store (KVS), the KVS comprised of a plurality of nodes; and a second node of the distributed KVS communicatively coupled to the first node; wherein upon receipt of a request for an event at one of the first or second nodes, the node that received the request is to determine whether it stores a lock associated with the event, and if the node that received the request stores the lock, the node that received the request is to respond to the request with an event ID associated with the event, or if the node that received the request does not store the lock, the node that received the request is to forward the request to the node that did not receive the request.

Example 11 includes the subject matter of example 10, or some other example herein, wherein each of the first and second nodes store a portion of data associated with the event.

Example 12 includes the subject matter of example 10 or 11, or some other example herein, wherein the event ID is unique across all of the plurality of nodes of the distributed KVS.

Example 13 includes the subject matter of any of examples 10-12, or some other example herein, wherein, if the node that received the request stores the lock, the node further is to initialize a lock value to indicate that the event is locked.

Example 14 includes the subject matter of any of examples 10-13, or some other example herein, wherein the distributed KVS is adapted to store a plurality of events, and wherein upon receipt of a request for an event the node that received the request is to locate an unlocked event from the plurality of events.

Example 15 is a non-transitory computer readable medium (CRM) comprising instructions that, when executed by a first node of a distributed data store, cause the first node to receive a request for a data acquisition event; determine, from a plurality of data acquisition events stored in the distributed data store, whether the first node stores a lock for an unlocked event; and if the first node stores the lock for an unlocked event, set the lock to a locked status and respond with an event ID corresponding to the event, or forward the request to a second node of the distributed data store that stores the lock.

Example 16 includes the subject matter of example 15, or some other example herein, wherein the instructions are to further cause the first node to respond with a key-value pair corresponding to the event ID.

Example 17 includes the subject matter of examples 15 or 16, or some other example herein, wherein the instructions are to cause the first node to set the lock to a locked status by setting a lock metadata field embedded with the data acquisition event.

Example 18 includes the subject matter of any of examples 15-17, or some other example herein, wherein the instructions are to further cause the first node to use a hash function in combination with the event ID to determine the second node to forward the request.

Example 19 includes the subject matter of any of examples 15-18, or some other example herein, wherein the instructions are to further cause the first node to receive, with the request for the data acquisition event, an identifier of a requestor, and store the identifier into the lock.

Example 20 includes the subject matter of any of examples 15-19, wherein the instructions are to further cause the first node to respond with a token indicating that a requestor holds the lock of the event corresponding to the event ID.

What is claimed is:

1. A non-transitory computer readable medium (CRM) comprising instructions that, when executed by a first node of a plurality of nodes that comprise a distributed data store, cause the first node to:
receive a request for a data acquisition event;
retrieve, from a plurality of unprocessed data acquisition events, where the unprocessed data acquisition events are stored across the plurality of nodes in the distributed data store, an event with a lock in an unlocked status;
determine whether the lock for the unlocked event is stored in the first node; and
respond with an event ID corresponding to the unlocked event if the first node stores the lock, or
forward the request to a second node, of the plurality of nodes of the distributed data store, that stores the lock.

2. The CRM of claim 1, wherein the instructions are to further cause the first node to set the lock to a locked status.

3. The CRM of claim 2, wherein the instructions are to cause the first node to set the lock to a locked status by setting a lock metadata field embedded with the data acquisition event.

4. The CRM of claim 1, wherein the instructions are to further cause the first node to use a hash function in combination with the event ID to determine the second node to forward the request.

5. A method for managing event locks in a distributed data store, the distributed data store adapted to store a plurality of data acquisition events, comprising:
receiving, at a first node of a plurality of nodes in the distributed data store, a request for a key-value pair for an unprocessed data acquisition event from the plurality of data acquisition events, the data acquisition events stored across the plurality of nodes;
locating, by the first node, in the distributed data store, an unlocked event;
determining, by the first node, whether a lock for the unlocked event is stored in the first node; and
responding, by the first node, to the request with a key-value corresponding to the unlocked event if the first node stores the lock, or
forwarding, by the first node if the first node does not store the lock, the request to a second node, of the plurality of nodes of the distributed data store, that stores the lock.

6. The method of claim 5, comprising retrieving, by the first node, an event ID corresponding to the unlocked event.

7. The method of claim 6, further comprising determining the identity of the second node by processing the event ID through a hash function.

8. The method of claim 5, further comprising initializing the lock, by the first node, where the first node stores the lock.

9. The method of claim 8, wherein initializing the lock comprises setting a lock value stored on the first node to indicate that the event is locked.

10. A system for distributed lock management for data acquisition, comprising:
a first node of a distributed key-value store (KVS), the KVS comprised of a plurality of nodes; and
a second node of the distributed KVS communicatively coupled to the first node;
wherein upon receipt of a request for an event, the event stored across the plurality of nodes, at one of the first or second nodes:
the node that received the request is to determine whether it stores a lock associated with the event, and
if the node that received the request stores the lock, the node that received the request is to respond to the request with an event ID associated with the event, or
if the node that received the request does not store the lock, the node that received the request is to forward the request to the node that did not receive the request.

11. The system of claim 10, wherein the event ID is unique across all of the plurality of nodes of the distributed KVS.

12. The system of claim 10, wherein, if the node that received the request stores the lock, the node further is to initialize a lock value to indicate that the event is locked.

13. The system of claim 10, wherein the distributed KVS is adapted to store a plurality of events, and wherein upon receipt of a request for an event the node that received the request is to locate an unlocked event from the plurality of events.

14. A non-transitory computer readable medium (CRM) comprising instructions that, when executed by a first node of a plurality of nodes comprising a distributed data store, cause the first node to:
receive a request for a data acquisition event;
determine, from a plurality of data acquisition events, the plurality of data acquisition events stored across the plurality of nodes in the distributed data store, whether the first node stores a lock for an unlocked event; and if the first node stores the lock for the unlocked event, set the lock to a locked status and respond with an event ID corresponding to the event, or forward the request to a second node, of the plurality of nodes comprising the distributed data store, that stores the lock.

15. The CRM of claim 14, wherein the instructions are to further cause the first node to respond with a key-value pair corresponding to the event ID.

16. The CRM of claim 14, wherein the instructions are to cause the first node to set the lock to a locked status by setting a lock metadata field embedded with the data acquisition event.

17. The CRM of claim 14, wherein the instructions are to further cause the first node to use a hash function in combination with the event ID to determine the second node to forward the request.

18. The CRM of claim 14, wherein the instructions are to further cause the first node to receive, with the request for the data acquisition event, an identifier of a requestor, and store the identifier into the lock.

19. The CRM of claim 14, wherein the instructions are to further cause the first node to respond with a token indicating that a requestor holds the lock of the event corresponding to the event ID.

* * * * *